US009354307B2

(12) United States Patent
Beeri et al.

(10) Patent No.: US 9,354,307 B2
(45) Date of Patent: May 31, 2016

(54) SYSTEM AND METHOD FOR VOLUME VISUALIZATION IN ULTRA-WIDEBAND RADAR IMAGING SYSTEM

(71) Applicant: Camero-Tech Ltd., Kfar Neter (IL)

(72) Inventors: Amir Beeri, Kfar Neter (IL); Ron Daisy, Raanana (IL)

(73) Assignee: CAMERO-TECH LTD., Kfar Neter (IL)

( * ) Notice: Subject to any disclaimer, the term of this patent is extended or adjusted under 35 U.S.C. 154(b) by 334 days.

(21) Appl. No.: 13/974,663

(22) Filed: Aug. 23, 2013

(65) Prior Publication Data

US 2014/0055297 A1 Feb. 27, 2014

(30) Foreign Application Priority Data

Aug. 23, 2012 (IL) .......................................... 221596

(51) Int. Cl.
G01S 13/89 (2006.01)
G01S 7/292 (2006.01)
G01S 13/00 (2006.01)
G01S 13/02 (2006.01)
G01S 13/88 (2006.01)

(52) U.S. Cl.
CPC ................. G01S 13/89 (2013.01); G01S 7/292 (2013.01); G01S 13/003 (2013.01); G01S 13/0209 (2013.01); G01S 13/887 (2013.01)

(58) Field of Classification Search
CPC ..... G01S 13/885; G01S 13/003; G01S 13/89; G01S 13/887; G01S 13/0209
USPC .................................... 342/22, 179–180, 191
See application file for complete search history.

(56) References Cited

U.S. PATENT DOCUMENTS

| 6,031,485 | A | 2/2000 | Cellai | |
|---|---|---|---|---|
| 6,573,855 | B1 * | 6/2003 | Hayakawa | G01S 13/88 342/176 |
| 6,917,784 | B2 * | 7/2005 | Martin | G01S 13/90 342/173 |
| 7,511,655 | B2 * | 3/2009 | Willey | G01S 13/87 342/179 |
| 8,060,339 | B2 * | 11/2011 | Ammar | G01S 7/411 342/22 |
| 8,344,934 | B2 * | 1/2013 | Ryland | G01S 13/9035 342/179 |
| 8,872,697 | B2 * | 10/2014 | Tapia | G01S 13/89 342/180 |
| 8,957,809 | B2 * | 2/2015 | Cist | G01S 7/04 342/176 |

(Continued)

*Primary Examiner* — John B. Sotomayor
*Assistant Examiner* — Marcus Windrich
(74) *Attorney, Agent, or Firm* — Browdy and Neimark, PLLC

(57) ABSTRACT

There are provided an ultra-wideband radar imaging system comprising an antenna with at least one receiver and a plurality of transmitters operating in multi-static mode, method of operating thereof and volume visualization unit to be used in conjunction with the multi-static ultra-wideband radar imaging system. The method comprises: receiving by said at least one receiver a plurality of signals, each respectively representing return data in a channel associated with the receiver and one of the transmitters among said plurality of transmitters, thus giving rise to a plurality of spatial data channels; among said plurality of spatial data channels selecting data channels for further processing; and providing volume visualization by processing data corresponding merely to the selected spatial data channels.

18 Claims, 11 Drawing Sheets

(56) References Cited

U.S. PATENT DOCUMENTS

| | | |
|---|---|---|
| 2003/0043067 A1 | 3/2003 | Johansson |
| 2003/0074812 A1* | 4/2003 | Stump ................ E02F 5/06 37/348 |
| 2009/0271146 A1* | 10/2009 | Ammar ................ G01S 7/411 702/155 |
| 2010/0207804 A1 | 8/2010 | Hayward |
| 2011/0025546 A1* | 2/2011 | Cook ................ G01S 7/2923 342/22 |
| 2012/0019406 A1* | 1/2012 | Sarkis ................ A61B 5/0507 342/22 |
| 2013/0082860 A1* | 4/2013 | Paglieroni ............ G01S 13/90 342/22 |
| 2013/0093611 A1* | 4/2013 | Crowley ............ G01S 7/4026 342/22 |
| 2013/0120181 A1* | 5/2013 | Hallquist ............ G01S 13/885 342/22 |

\* cited by examiner

SYSTEM AND METHOD FOR VOLUME VISUALIZATION IN ULTRA-WIDEBAND RADAR IMAGING SYSTEM

CROSS-REFERENCES TO RELATED APPLICATIONS

The present application claims benefit from Israel Application No. 221596, filed on Aug. 23, 2013 and incorporated hereby by reference in its entirety.

TECHNICAL FIELD

The presently disclosed subject matter relates, in general, to volume visualization in ultra-wideband radar imaging systems, and, more particularly, to multi-static UWB radar imaging system and methods of volume visualization therein.

BACKGROUND

Ultra-wideband (UWB) is a term for a classification of signals that occupy a substantial bandwidth relative to their centre frequencies (for example, according to the Federal Communications Commission (FCC) Rules, UWB signal is a signal whose fractional bandwidth (the ratio between its bandwidth to its center frequency) is equal to or greater than 0.2, or its bandwidth is equal to or greater than 500 MHz.). This bandwidth corresponds in the time domain to very short pulses and allows UWB based radar systems to obtain more accurate target information, and makes it possible to design radars with improved spatial resolution compared to conventional radar. Therefore UWB radar devices are common for through-the-obstacle radar-based imaging systems enabling information gathering through obstacles such as walls, doors, ground, smoke, vegetation and other visually obstructing substances and, as such, may be invaluable for Intelligence, Surveillance, and Reconnaissance (ISR) applications, including military, counter-terrorism forces and law enforcement applications. These applications require effective volume visualization based on obtained signals.

The terms "volume visualization" and "image reconstruction" used in this patent specification include any kind of image-processing, volume rendering or other image-reconstructing computing used to facilitate displaying three-dimensional (3D) data on a two-dimensional (2D) image surface.

The radar-based image systems can use different types of radars. While in mono-static radar systems transmitter and receiver can share a common antenna, bi-static radar comprises a transmitter and receiver which are spatially separated. The relative distance is comparable to the expected target distance, thereby enabling receiving a signal also when the geometry of the reflecting object reflects very little or no energy in the direction of the mono-static radar. Multi-static radar systems include multiple spatially diverse mono-static radar or bi-static radar components with a shared area of coverage. The spatial diversity utilized by multi-static systems allows for simultaneously receiving different aspects of the scanned target.

The problems of volume visualization in multi-static radar image systems have been recognized in the contemporary art and various systems have been developed to provide a solution, for example:

US Patent Application No. 2003/074812 (Stump) discloses a portable structure supporting a subsurface imaging system and moveable over a given imaging site. At least a first antenna of a plurality of antennae is oriented in a manner differing from an orientation of a second antenna of the plurality of antennae, such as the first antenna being orientated substantially orthogonal to the second antenna. The antennae may operate in a bi-static mode. Transmitter and receiver circuitry, coupled to the antennae, respectively generates electromagnetic probe signals and receives electromagnetic return signals resulting from the probe signals. A processor processes the received electromagnetic return signals. A display may be provided as part of the subsurface imaging system and/or as part of a processing system separate from the subsurface imaging system which processes the received electromagnetic return signals. The processor can generate two-dimensional and/or three-dimensional detection data using the received electromagnetic return signals.

US Application No. 2003/043067 (Johansson et al.) discloses methods and systems capable of identifying a buried object using array-based ground penetrating radar having a control device, a plurality of transmit antennas, and a plurality of receive antennas. Such methods and systems receive a transmit timing input signal and a receive timing input signal. Such methods and systems comprise a first delay circuit for receiving the transmit timing input signal and generating a number of intermediate transmit timing signals delayed with respect to each other by a delay time, and transmit output switch circuit to select either the transmit timing input signal or a corresponding one of the intermediate transmit timing signals as a corresponding output transmit timing signal. Such methods and systems also comprise a second delay circuit for receiving the receive timing input signal and generating a number of intermediate receive timing signals delayed with respect to each other by the delay time, a shift-delay circuit coupled to the second delay circuit and the receive timing input signal to add the delay time to the intermediate receive timing signals, and a receive output switch circuit to select either the receive timing input signal or a corresponding one of the intermediate receive timing signals as a corresponding output receive timing signal. Such methods and systems also comprise an antenna array comprising a plurality of transmit antennas, a plurality of receive antennas, and means for selectively enabling the transmit and receive antennas to allow each of the receive antennas to receive energy from any one of the transmit antennas.

U.S. Pat. No. 6,031,485 (Cellai et al.) discloses a hi-static spread spectrum digital radar including a transmitting antenna and a receiving antenna array separate from and positioned at a distance from the transmitting antenna. The transmitting antenna transmits a pseudo random digital signal as produced by a pseudo random digital signal generator. The receiving antenna array receives signals simultaneously and in parallel as reflected from a target by the transmitting antenna. Analog-to-digital converters are connected respectively to each element of the receiving antenna array so as to convert the received analog signal into a digital signal. Digital beams are produced and directed to a set of digital receivers. A processor is provided to produce a digital output from the set of digital receivers.

US Patent Application No. 2009/271146 (Ammar) discloses concealed object detection using electromagnetic and acoustic multi-static imaging systems and methods. A method of simultaneously screening plural subjects for concealed objects includes transmitting a signal into a screening area where there is at least one subject to be screened having an associated object, receiving a reflected signal from the object when the object is located within the screening area, processing the reflected signal using multi-static Fourier space sampling and tomographic reconstruction to generate a three-dimensional image of the object and displaying the three-dimensional image. The transmitting and receiving are performed using a multi-directional array including at least three sensors. An object detection system includes a screening area, a multi-directional array including at least three sensors, a processor configured to execute multi-static Fourier space sampling and tomographic reconstruction and a display.

US Patent Application No. 2010/207804 (Hayward et al.) discloses a method and system for locating objects in a region having a high degree of multipath susceptibility comprising a plurality of transducers, each being a transmit or receive antenna, and being arranged about the region in known locations, to form a bi-static or multi-static radar, with some embodiments being MIMO systems. Signals transmitted by the transmit antenna(s) are received at each receive antenna and processed to form a set of channel impulse responses, or power delay profiles, representative of the region at a given time. A second set is formed at a different time, and the difference between the two sets is calculated, the difference containing information on movement within the region. The difference may be processed to localize the moving object(s) by graphical means, e.g. by generating an x-y image representative of the region, and accumulating at each pixel appropriate values of the profile difference selected according to the propagation delay between a transmit-receive antenna pair via a region point represented by the pixel.

US Patent Application No. 2011/025546 (Cook et al.) discloses a method and apparatus for sensing a target through a wall or obstruction by a Moving Target Indicator (MTI) radar sensor. In an exemplary embodiment, a series of radar pulses are transmitted at frequencies less than about 5 GHz. Radar return signals are received at a plurality of receive antenna array sub-apertures. The radar return signals are processed by a digital beam-former to form multiple beams. Target detection processing detects moving and stationary targets through a plurality of parallel target detection signal processing paths.

SUMMARY

In accordance with certain aspects of the currently presented subject matter, there is provided a method of operating an ultra-wideband radar imaging system comprising an antenna with at least one receiver and a plurality of transmitters operating in multi-static mode, the method comprising: receiving by said at least one receiver a plurality of signals, each respectively representing return data in a channel associated with the receiver and one of the transmitters among said plurality of transmitters, thus giving rise to a plurality of spatial data channels; among said plurality of spatial data channels selecting data channels for further processing; providing volume visualization by processing data corresponding merely to the selected spatial data channels. In accordance with further aspects of the currently presented subject matter and in optional combination with other aspects, selecting spatial data channels for further processing can comprise: generating a two-dimensional map of a plurality of representative channels corresponding to said plurality of spatial data channels; dividing the generated two-dimensional map into a plurality of collection areas, each matching a contribution criterion, wherein the contribution criterion requires substantially equal contribution of all representative channels mapped to a given collection area; collecting from each collection area $N \leq N_{max}$ representative channels, where $N_{max}$ is a threshold indicative of a maximal number of channels to be collected from a collection area; and selecting spatial data channels corresponding to the collected representative channels. Optionally, $N \leq N_{max}$ representative channels can be collected from a given collection area in an arbitrary manner.

Generating the two-dimensional map can comprise projecting representative locations characterizing the representative channels on a two-dimensional plane substantially perpendicular to the antenna's direction. The collection areas can be obtained by dividing the generated two-dimensional map into equal-size squares with the side's size defined by the wavelength of transmitted/received signals. Optionally, the collection areas can be obtained by dividing the generated two-dimensional map into areas of different size (and, optionally, different shape) enabling tessellated coverage of the 2D map. The minimal size of a given area is defined by a pre-defined minimal number of representative channels in a collection area, and the maximal size if defined by the contribution criteria.

In accordance with further aspects of the currently presented subject matter and in optional combination with other aspects, at least part of the spatial data channels can be selected in accordance with relative distance of corresponding representative channels from adjacent voxels corresponding to a region of interest. Selecting the spatial data channels can comprise assigning to each representative channel a distance score corresponding to a relative distance of two adjacent voxels from the respective channel and selecting spatial data channels corresponding to the representative channels with distance score matching a distance criterion. Optionally, the assigned distance score can correspond to a ratio R between respective relative distance and an operating wavelength $\lambda$ of the radar.

In accordance with further aspects of the currently presented subject matter and in optional combination with other aspects, the channels can be selected in accordance with a shape criterion requiring an even distance of the selected channels from a shaped object. Such selection can be followed by further selection of channels, among the previously selected channels, in accordance with relative distance, maximal number of channels from a given collection area and/or other criteria.

In accordance with other aspects of the currently presented subject matter, there is provided an ultra-wideband radar imaging system comprising a volume visualization unit operatively coupled to an antenna with at least one receiver and a plurality of transmitters operating in multi-static mode, wherein: said at least one receiver is configured to receive a plurality of signals, each respectively representing return data in a channel associated with the receiver and one of the transmitters among said plurality of transmitters, and wherein said volume visualization unit is configured to digitalize said plurality of signals thus giving rise to a plurality of spatial data channels; to select among said plurality of spatial data channels data channels for further processing; and to provide volume visualization by processing data corresponding merely to the selected spatial data channels.

Selecting the spatial data channels by the volume visualization unit can comprise: generating a two-dimensional map of a plurality of representative channels corresponding to said plurality of spatial data channels; dividing the generated two-dimensional map into a plurality of collection areas, each matching a contribution criterion, wherein the contribution criterion requires substantially equal contribution of all representative channels mapped to a given collection area; collecting from each collection area N≤Nmax representative channels, where Nmax is a threshold indicative of a maximal number of channels to be collected from a collection area; and selecting spatial data channels corresponding to the collected representative channels.

Alternatively or additionally, the volume visualization unit can be configured to select at least part of the spatial data channels in accordance with relative distance of corresponding representative channels from adjacent voxels corresponding to a region of interest.

In accordance with other aspects of the currently presented subject matter and in optional combination with previous aspects, there is provided a volume visualization unit to be used in conjunction with an ultra-wideband radar comprising an antenna with at least one receiver and a plurality of transmitters operating in multi-static mode. Said volume visualization unit is configured: to digitalize a plurality of signals each respectively representing return data in a channel associated with said at least one receiver and one of the transmitters among said plurality of transmitters thus giving rise to a plurality of spatial data channels; to select among said plurality of spatial data channels data channels for further processing; and to provide volume visualization by processing data corresponding merely to the selected spatial data channels.

Among advantages of certain embodiments of the presently disclosed subject matter is the capability to minimize image distortion for multi-static antenna arrays with no need in antenna steering. Among further advantages is capability to gain benefits of multi-static techniques (detecting multiple targets at the same time, simultaneous dual polarization scanning, etc.) also for movable antennas and antennas with dynamically variable shapes.

BRIEF DESCRIPTION OF THE DRAWINGS

In order to understand the disclosed subject matter and to see how it can be carried out in practice, embodiments will now be described, by way of non-limiting example only, with reference to the accompanying drawings, in which:

FIG. 8a illustrates the image rendered without channel selection; FIG. 8b illustrates the image rendered with channel selection in accordance with certain embodiments of the presently disclosed subject matter.

DETAILED DESCRIPTION OF EMBODIMENTS

In the following detailed description, numerous specific details are set forth in order to provide a thorough understanding of the disclosed subject matter. However, it will be understood by those skilled in the art that the presently disclosed subject matter can be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "processing", "computing", "calculating", "determining", "selecting", "assigning", "collecting", or the like, refer to the action and/or processes of a computer that manipulate and/or transform data into other data, said data represented as physical, such as electronic, quantities and/or said data representing the physical objects. The term "computer" should be expansively construed to cover any kind of electronic system with data processing capabilities, including, by way of non-limiting example, systems and parts thereof disclosed in the present applications.

The operations in accordance with the teachings herein can be performed by a computer specially constructed for the desired purposes or by a general-purpose computer specially configured for the desired purpose by a computer program stored in a computer readable storage medium.

Embodiments are not described with reference to any particular programming language. It will be appreciated that a variety of programming languages can be used to implement the teachings as described herein.

The references cited in the background teach many principles of operating UWB radar image systems and volume visualization therein that are applicable to the presently disclosed subject matter. Therefore the full contents of these publications are incorporated by reference herein where appropriate for appropriate teachings of additional or alternative details, features and/or technical background.

The term "criterion" used in this patent specification should be expansively construed to include any compound criterion, including, for example, several criteria and/or their logical combinations.

Figure 1:
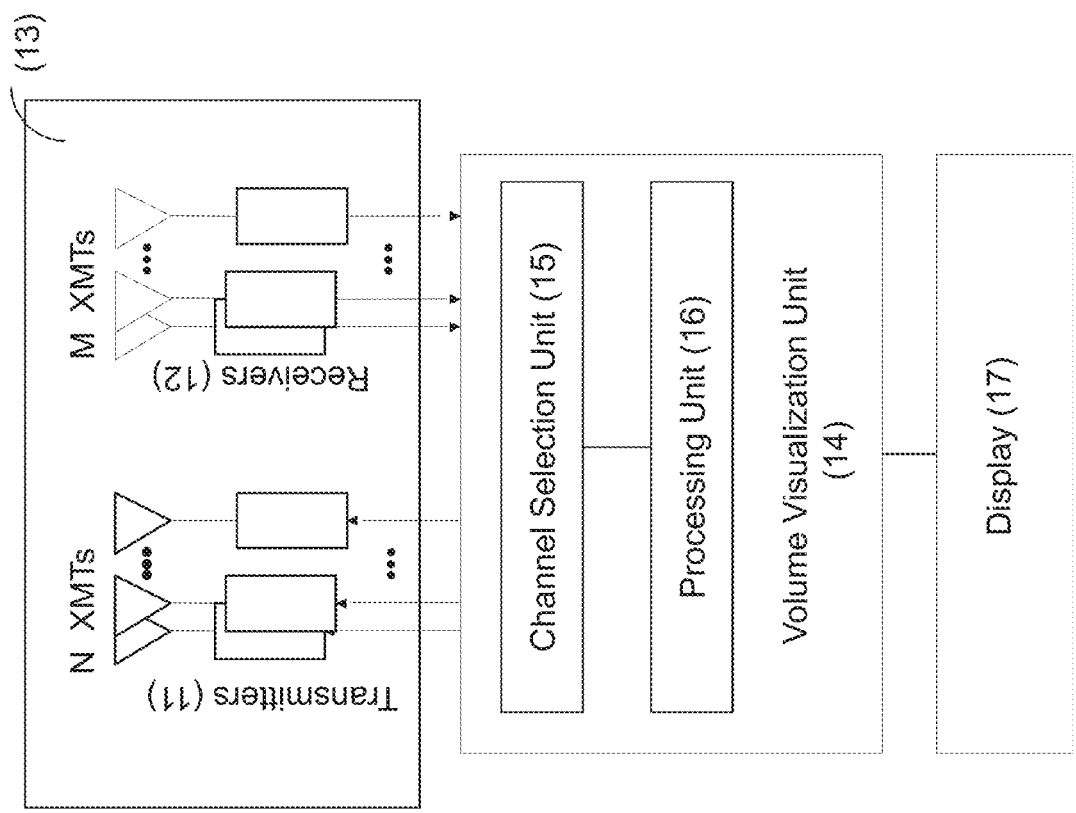
FIG. 1 illustrates a generalized functional diagram of an UWB radar imaging system in accordance with certain embodiments of the currently presented subject matter.

Bearing this in mind, attention is drawn to FIG. 1 illustrating a functional diagram of an UWB radar imaging system in accordance with certain embodiments of the currently presented subject matter. The illustrated imaging system comprises N≥2 transmitters (11) and M≥1 receivers (12 arranged in at least one multi-static antenna array (13), wherein each transmitter and each receiver can have horizontal or vertical polarization. In the multi-static mode there is at least one receiver capturing the scattered/reflected waves resulting from transmitting pulse signals (or other form of UWB signal, such as, for example, M-sequence coded signal, etc.) to a space to be imaged by at least two transmitters. Each pair of transmitter and receiver forms a spatially distinct channel characterized by the respective transmitter and receiver and polarization thereof. Thus, the multi-static antenna array 13 can provide three separate channels sets comprising, respectively, vertical, horizontal and cross-polar channels. To enable high quality imaging, sampling needs to be provided from several channels, further combining information from multiple channels having a shared coverage. Each channel can be characterized by its own distinct location attributed to represent the respective channel. By way of non-limiting example, the location can be calculated as the spatially middle location between transmitter and receiver. It is to be noted that the width of antenna beam is configured to be sufficient for covering the area of interest with spatially distinct channels.

Figure 2:
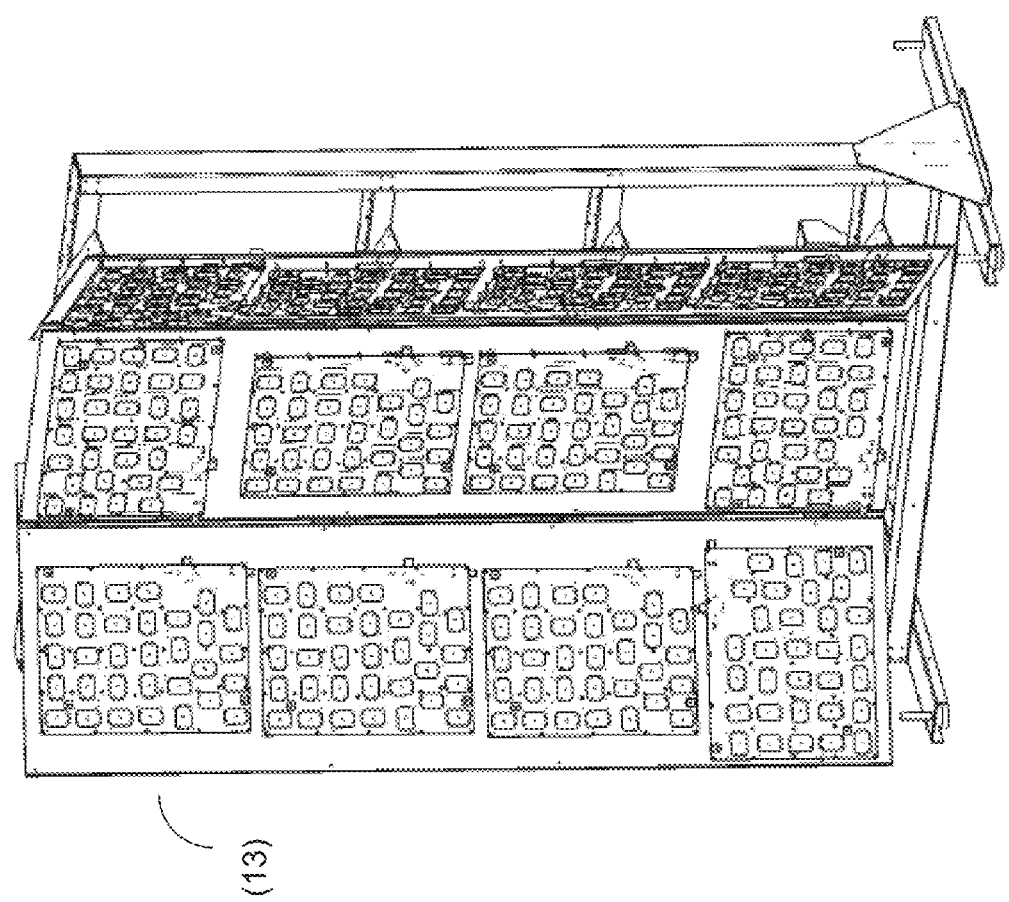
FIG. 2 illustrates a non-limiting example of a generalized view of antenna array in accordance with certain embodiments of the currently presented subject matter.

A non-limiting example of a generalized view of antenna array 13 is illustrated in FIG. 2. The illustrated antenna array comprises a plurality of antennas each associated with either a transmitter or receiver and in either vertical or horizontal polarization. It is to be noted that antennas could be arranged in a non-flat array (e.g. a cylindrically shaped array, etc.).

Referring back to FIG. 1, the return signals from the multiple channels are transferred to a volume visualization unit (14) coupled with the antenna array (13). These received multiple signals correspond to multiple reflection elements in the volume and can be linearly combined with respect to time to create a 3D volumetric matrix that represents the reflected information in the volume.

The volume visualization unit is capable of receiving the channel-related signals from the antenna array and providing a digitalization and further processing thereof. The volume visualization unit (14) comprises a channel selection unit 15 operatively coupled to a processing unit 16. As will be further detailed with reference to FIGS. 3-9, the channel selection unit 15 is configured to dynamically select, among multiple digitalized channels constituted by transmitter/receiver pairs, a plurality of channels for further processing. The processing unit 16 provides processing necessary for visualization of the data that corresponds to the selected channels. This processing can be provided using different techniques, some of which are known in the art. The channel selection and processing of the respective data are provided in real time or near real time. Processing results are transferred for rendering at a display (17) coupled to the volume visualization unit.

Note that the invention is not bound by the specific UWB radar imaging system described with reference to FIGS. 1-2 and/or visualization processing technique. Equivalent and/or modified functionality can be consolidated or divided in another manner and can be implemented in any appropriate combination of software, firmware and hardware. The volume visualization unit can be implemented as a suitably programmed computer.

For purpose of illustration only, the following description is provided for time-domain image reconstruction based on ultra-wide band pulses at the transmitter output. Those versed in the art will readily appreciate that the teachings of the presently disclosed subject matter are, likewise, applicable to the frequency-domain imaging.

Figure 3:
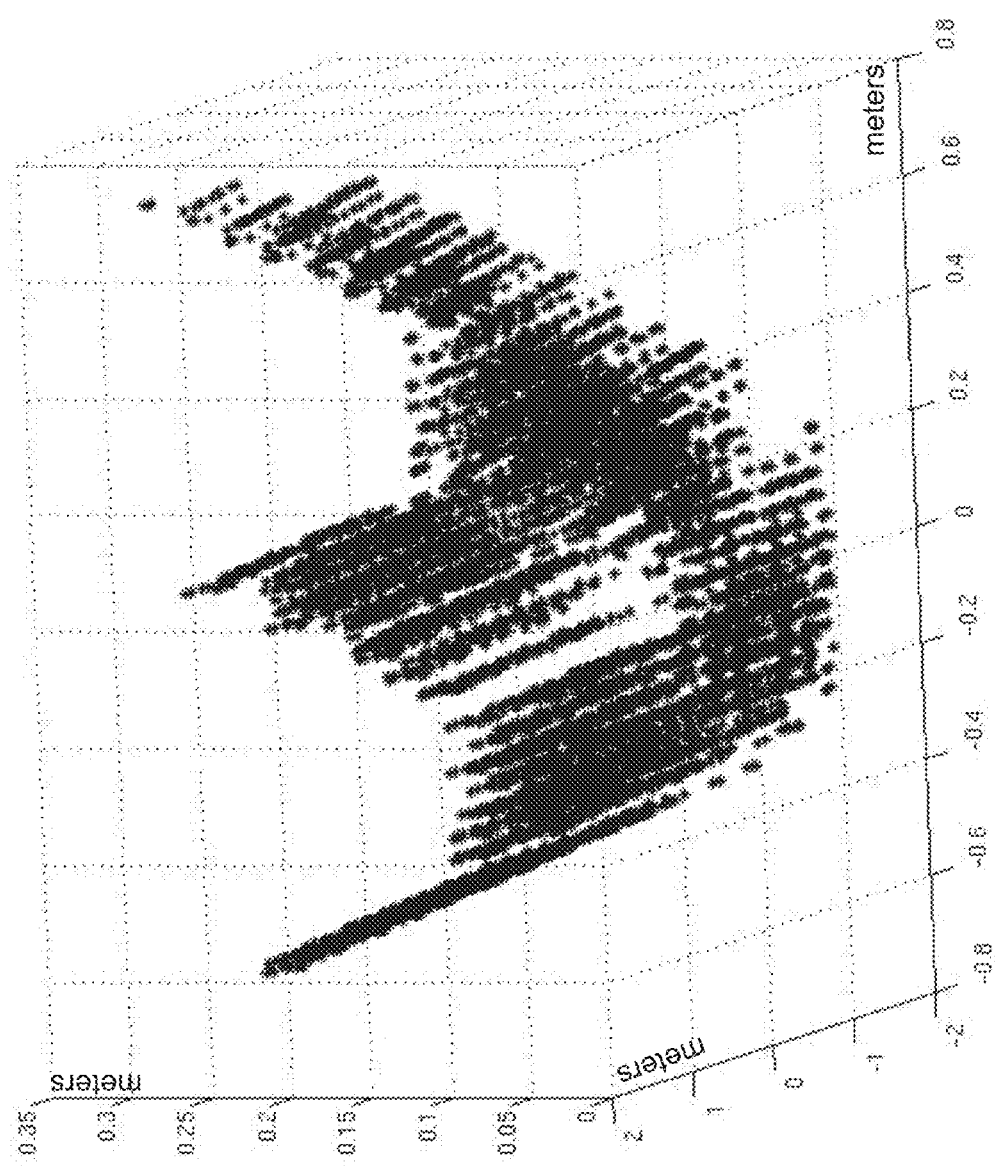
FIG. 3 illustrates an exemplary channel spatial representation of vertically polarized channels in a multi-static antenna array with a cylindrical aperture.
Figure 8A:
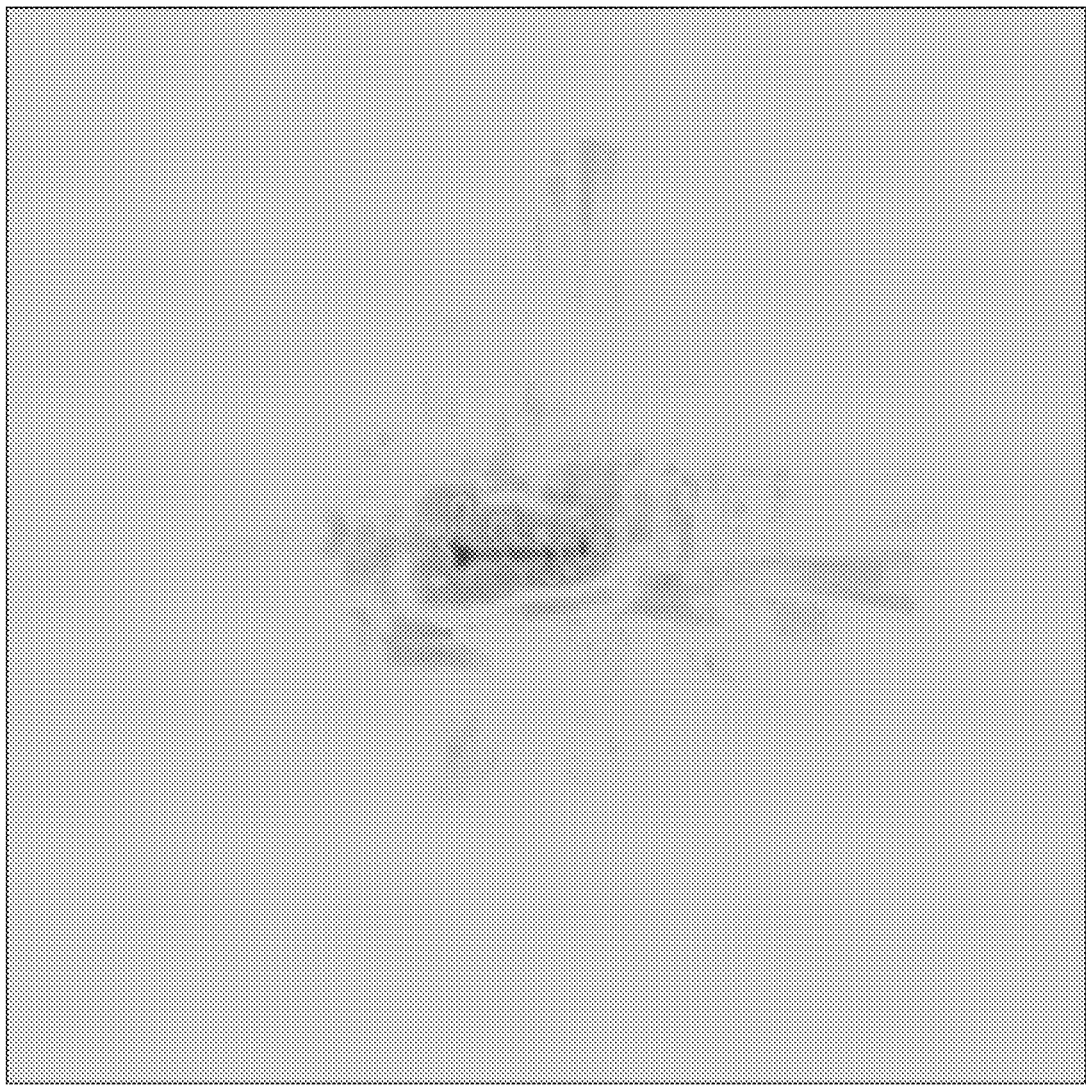
FIGS. 8a-8B illustrate non-limiting examples of rendered images of the same objects.

Unlike standard evenly spaced Nyquist sampling scheme in mono-static radar systems, a multi-static antenna array is characterized by uneven antenna dispersion. Considerable distortion of the received information in a multi-static antenna array can result from design constraints (e.g. antenna mechanical size compared with the wavelength requirements, flatness of antenna array, location of transmitters/receiver, etc.), dual polarization of the receivers and transmitters, separate attenuation of signals received from different ranges in near range volume and other factors. FIG. 3 illustrates an exemplary channel spatial representation of vertically polarized channels in a multi-static antenna array with a cylindrical aperture. As illustrated, while the cylindrical aperture enables spatial location of respective channels, the relative representative locations are not evenly dispersed. Performing three dimensional volume visualization using all available channels may result in substantial distortion of the output image where sections of the imaged volume, typically the ones located in front, are characterized by more representative channels and are enlighten un-proportionally stronger than areas characterized by fewer representative channels (e.g. the edge areas) FIG. 8a illustrates a non-limiting example of a rendered image with distortion corresponding to the exemplary channel spatial representation illustrated in FIG. 3.

Figure 4:
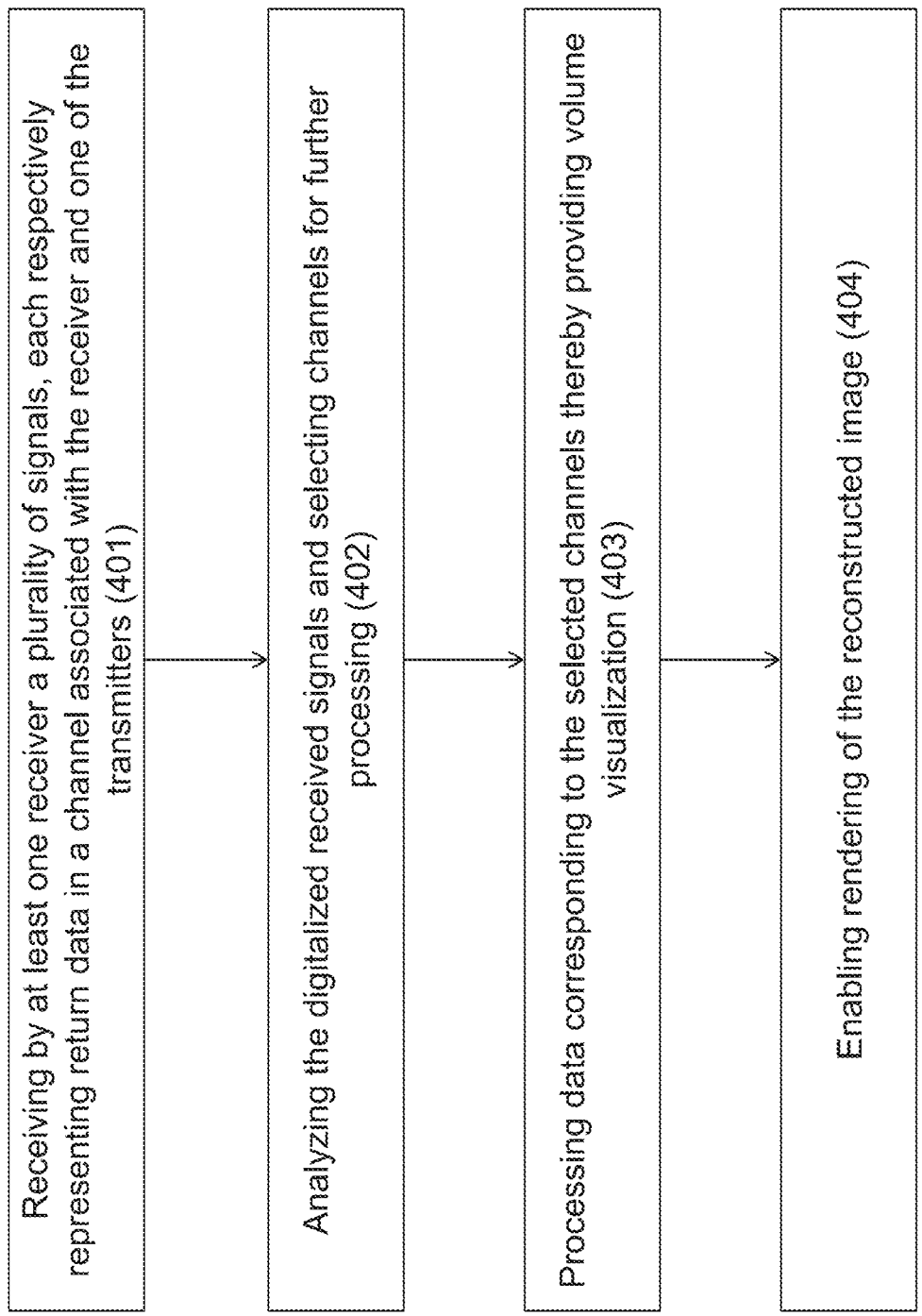
FIG. 4 illustrates a generalized flow diagram of operating the UWB radar imaging system in accordance with certain embodiments of the presently disclosed subject matter.

Referring to FIG. 4, there is illustrated a generalized flow diagram of operating the UWB radar imaging system in accordance with certain embodiments of the presently disclosed subject matter.

Responsive to ultra-wide band pulses at the transmitter output, one or more objects located in the scanned volume reflect hack the pulses toward all receivers with multiple reflections. Each reflection arrives at a time corresponding to the electromagnetic propagation from the transmitter to the target and back to the receiver. Thus, each received signal represents reflected information respectively aggregated in a time domain from all the volumes.

Upon receiving (401) by at least one receiver a plurality of signals, each respectively representing return data in a channel associated with the receiver and one of the transmitters, the volume visualization unit (14) digitalizes the received signals, and selects (402) spatial channels for further processing. Channel selecting is further detailed with reference to FIGS. 5-9.

Upon selecting the channels, volume visualization unit processes (403) data corresponding to the selected channels thereby providing volume visualization. The image can be reconstructed with the help of back projection technique by overall integration for the selected channels of time domain channel values associated which each voxel.

The back projection processing includes calculating, for each voxel and for each pair of transmitter and receiver in the selected channels, the distance between the transmitter, the voxel and the receiver. The voxel overall value is defined as the sum of all time-domain values associated with each selected channel. Going over all channels yields a voxel value and going over all voxels yields a 3D volume. It is to be noted that image reconstruction is not bound by the back projection processing and the selected channels can be processed using other volume visualization techniques.

The data resulting from the volume visualization process are transferred (404) for rendering at the display (17) coupled to the volume visualization unit.

Optionally, the channels can be further re-selected to improve image resolution for the area of interest. By way of non-limiting example, in applications related to passengers screening, initial channel selection can be provided to find out suspicious areas in a body (if any), while visualization of such suspicious areas can be provided by processing the channels re-selected in accordance with the area.

Real time selecting of channels for further rendering processing enables operating the antenna in a mode of configurable beam, thus optimizing resolution of object(s) of interest.

Figure 5:
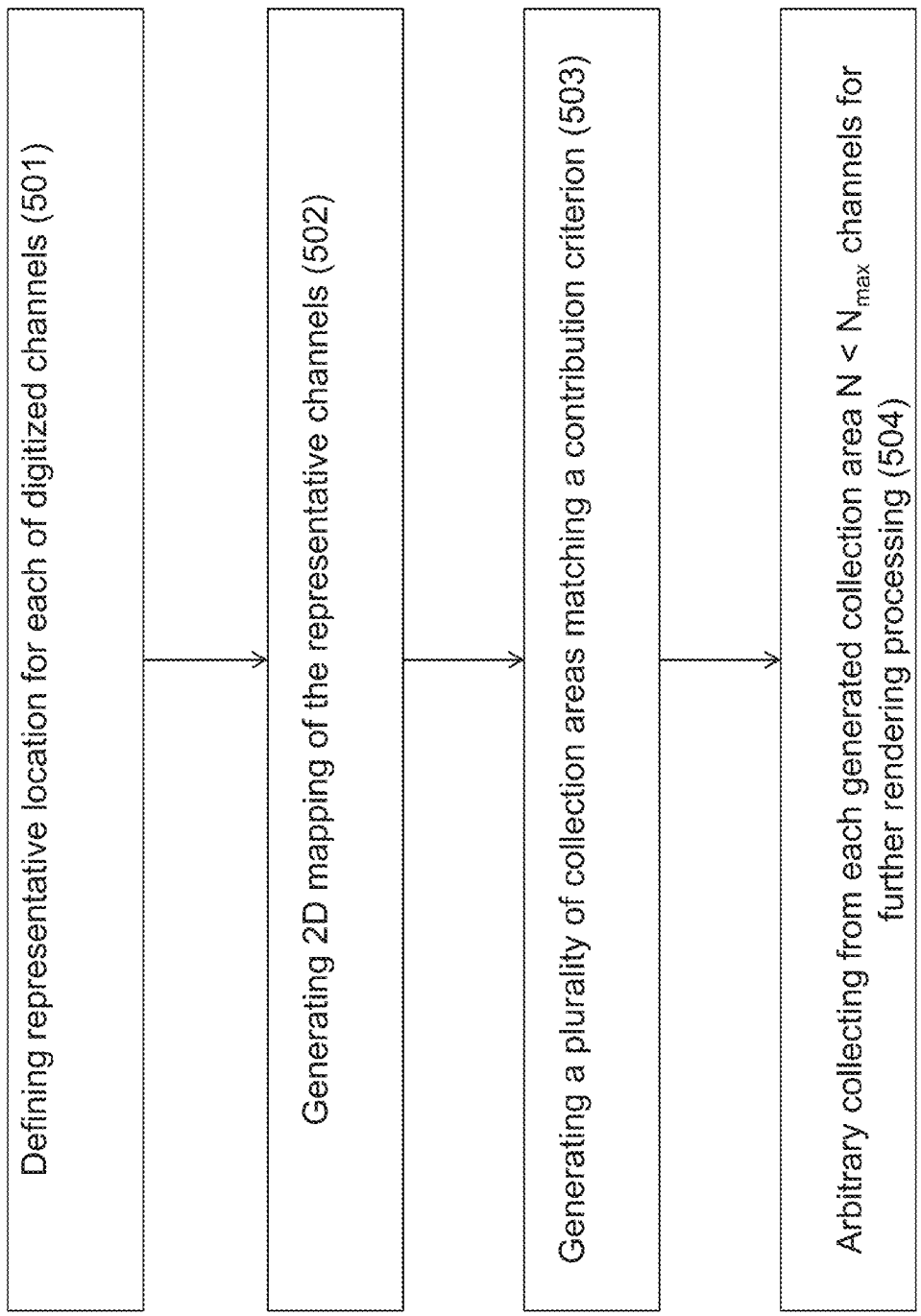
FIG. 5 illustrates a generalized flow diagram of selecting channels for further volume visualization processing in accordance with certain embodiments of the presently disclosed subject matter.

Referring to FIG. 5, there is illustrated a generalized flow diagram of selecting the channels for further volume visualization processing in accordance with certain embodiments of the presently disclosed subject matter. The channel selection and processing of the respective data are provided in real time or near real time.

The volume visualization unit defines (501) representative location for each digitized spatial channel. By way of non-limiting example, the representative location can be defined as the mean between transmitter and receiver, further assuming that information extracted from a representative channel with transmitter and receiver located in that mean center is equivalent to information corresponding to a channel created from a separated transmitter and receiver.

Figure 6:
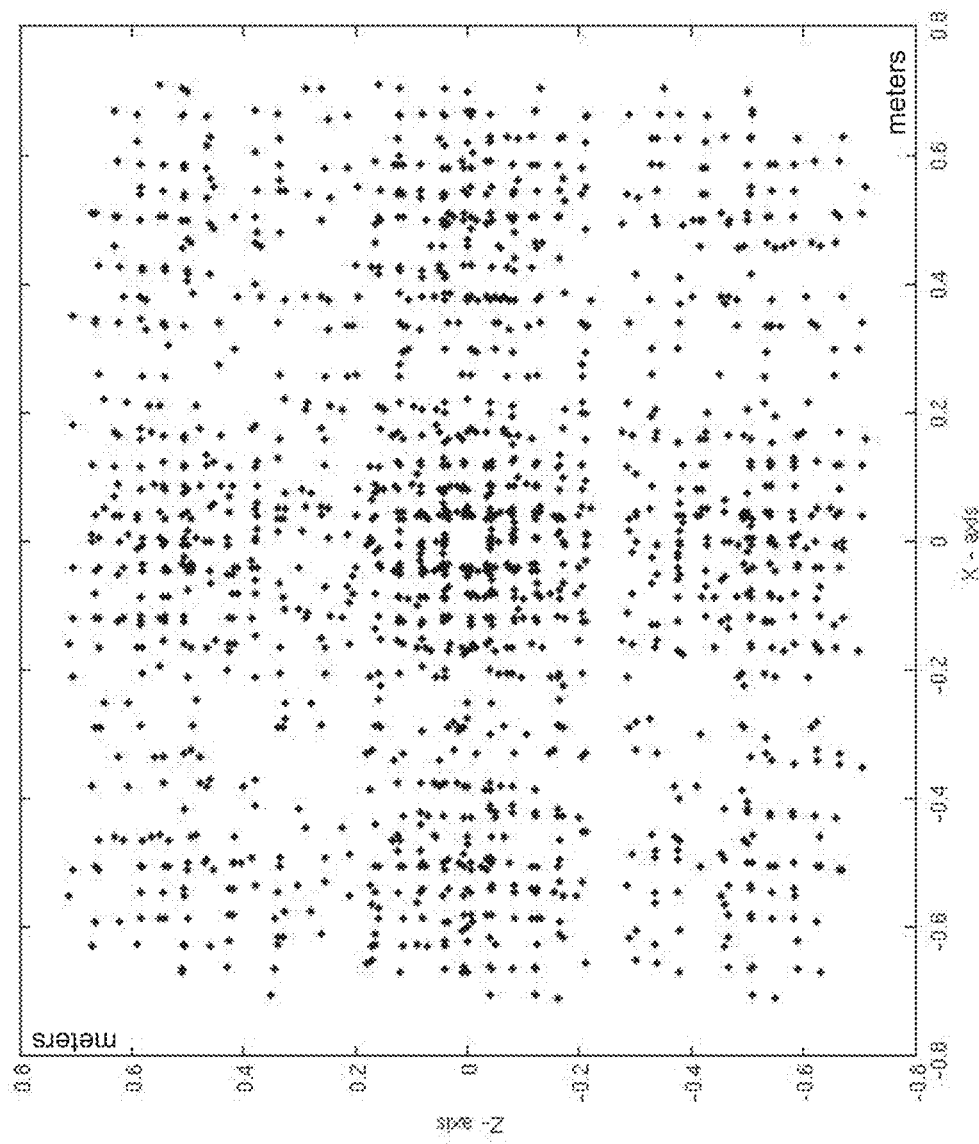
FIG. 6 illustrates a schematic example of 2D mapping of the representative channels corresponding to spatial channels illustrated in FIG. 3.

The volume visualization unit provides 2D mapping (502) of the representative channels. By way of non-limiting example, 2D mapping can be provided by projecting the defined representative locations of the channels on a 2D plane perpendicular to the antenna's direction (e.g. located at one end of 3D volume). It is to be noted that the multi-static antenna can be implemented in different shapes, for example physical transmitters and receivers can be parts of cylindrical, spherical or otherwise shaped array enhancing image resolution. FIG. 6 illustrates an example of 2D mapping of the representative channels corresponding to spatial channels illustrated in FIG. 3. Similar to the spatial channels illustrated in FIG. 3, the 2D projected representative locations of the channels are not dispersed evenly. As the nature of back projection and similar rendering techniques does not allow differentiating between separate contributions of each channel, rendering the non-evenly dispersed channels results in a distorted image illustrated by way of non-limiting example in FIG. 8*a*.

The volume visualization unit further uses the generated 2D map of the representative channels for generating (503) a plurality of collection areas, each matching a contribution criterion. The contribution criterion requires substantially equal contribution of all representative channels mapped to a given collection area. By way of non-limiting example, the collection areas matching the contribution criteria can be generated by dividing the generated 2D map of representative channels into equal-size squares with the side's size defined by the wavelength of transmitted/received signals, said areas matching Nyquist sampling theory. By way of non-limiting example, for 10 GHz signals the size of square side can be selected from the 0.35-0.75 cm range. By way of alternative non-limiting example, for 10 GHz signals the size of square side can be selected about 5 cm, thus providing a compromise between Nyquist requirements and a requirement of minimizing amount of collection areas with low number of representative channels (e.g. <2 per a collection area).

By way of another alternative non-limiting example, the 2D map can be divided into collection areas of different size (and, optionally, different shape) enabling tessellated coverage of the 2D map. The minimal size of the area is defined by a predefined minimal number of representative channels in a collection area, and the maximal size if defined by the contribution criteria.

Figure 7A:
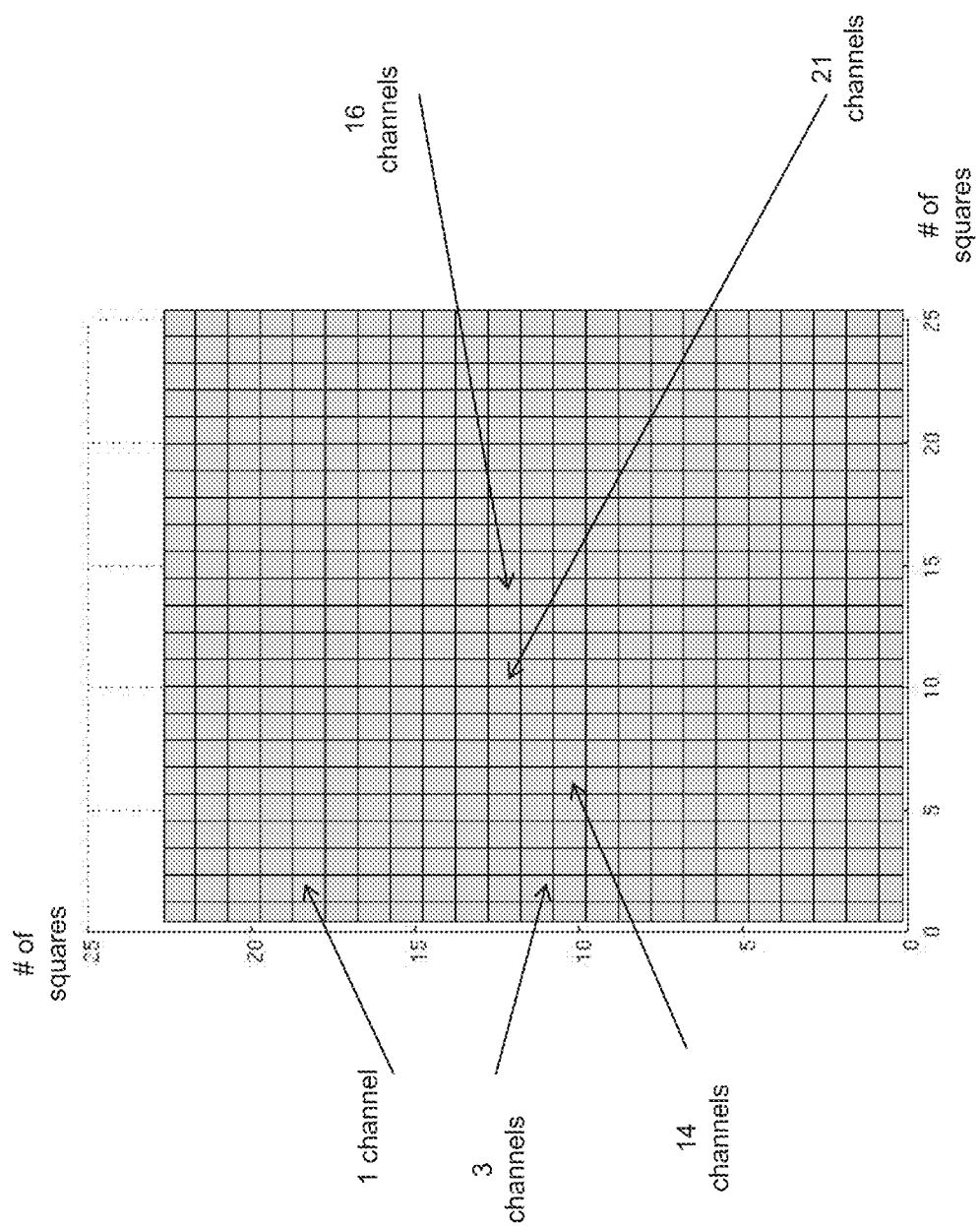
FIGS. 7a-7b schematically illustrate a 2D map of representative channels illustrated in FIG. 6 and divided into collecting areas in accordance with certain embodiments of the presently disclosed subject matter.

FIG. 7*a* schematically illustrates the 2D map of representative channels illustrated in FIG. 6 and divided into square collection areas with 5 cm side size. For each generated collection area, the volume visualization unit counts the number of projected representative channels mapped to the area. By way of non-limiting example, such numbers are denoted for some of the squares in FIG. 7*a*.

As illustrated, some densely populated squares in the center are characterized by high numbers of representative channels, while the edge squares are associated with few representative channels.

Figure 7B:
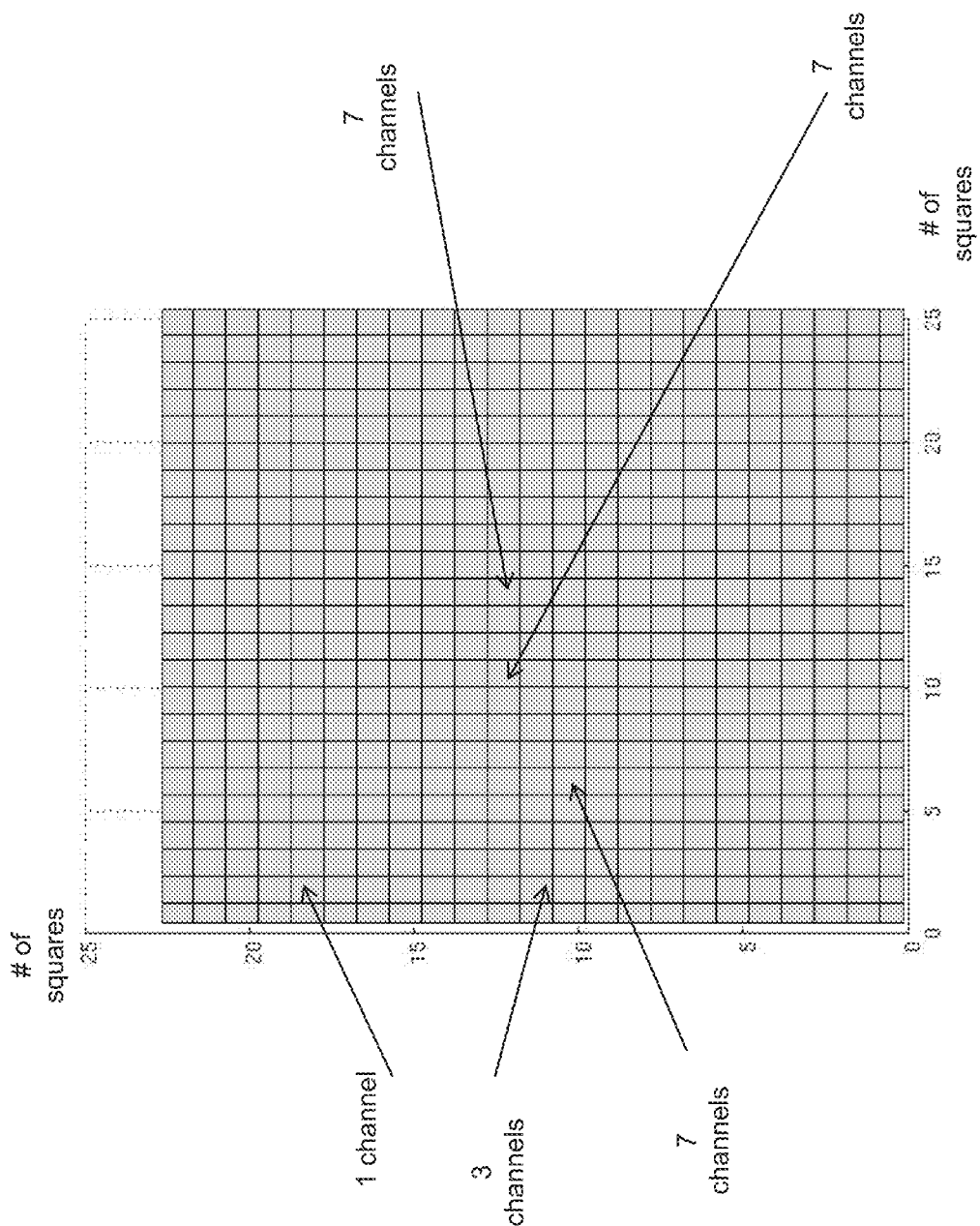

The volume visualization unit further collects (504) from each collection area $N \leq N_{max}$ representative channels for further processing the corresponding digitalized spatial channels. $N_{max}$ is a threshold characterizing the maximal number of representative channels to be collected from each area for further rendering processing (and, accordingly, the maximal number of spatial channels from a collection area to be processed). The threshold $N_{max}$ can be predefined in accordance with shape of antenna, characteristics of target and/or other criteria. Alternatively or additionally, the threshold $N_{max}$ can be configured as adaptive to scene conditions and/or imaging scenario (e.g. $N_{max}$ can be real-time or near real-time adaptive to signal-to-noise ratio characterizing the scene or certain parts thereof). The representative channels (and, accordingly, corresponding number of digitalized spatial channels) from each area can be collected in an arbitrary manner. Non-collected channels do not undergo further processing. FIG. 7*b* schematically illustrates the same areas as illustrated in FIG. 7*a*; however, the numbers denoted for the same squares as in FIG. 7*a* illustrate respective numbers of representative channels to be collected. In the illustrated example $N_{max}=7$ and, accordingly, the number N of channels arbitrary collected from each area $N \leq 7$. It is to be noted that $N_{max}$ is selected as a tradeoff between under-sampled but not-deformed image corresponding to low $N_{max}$ and over-sampled yet deformed image corresponding to high $N_{max}$.

Optionally, operations 501-504 can be provided separately for channels with different polarization.

Figure 9:
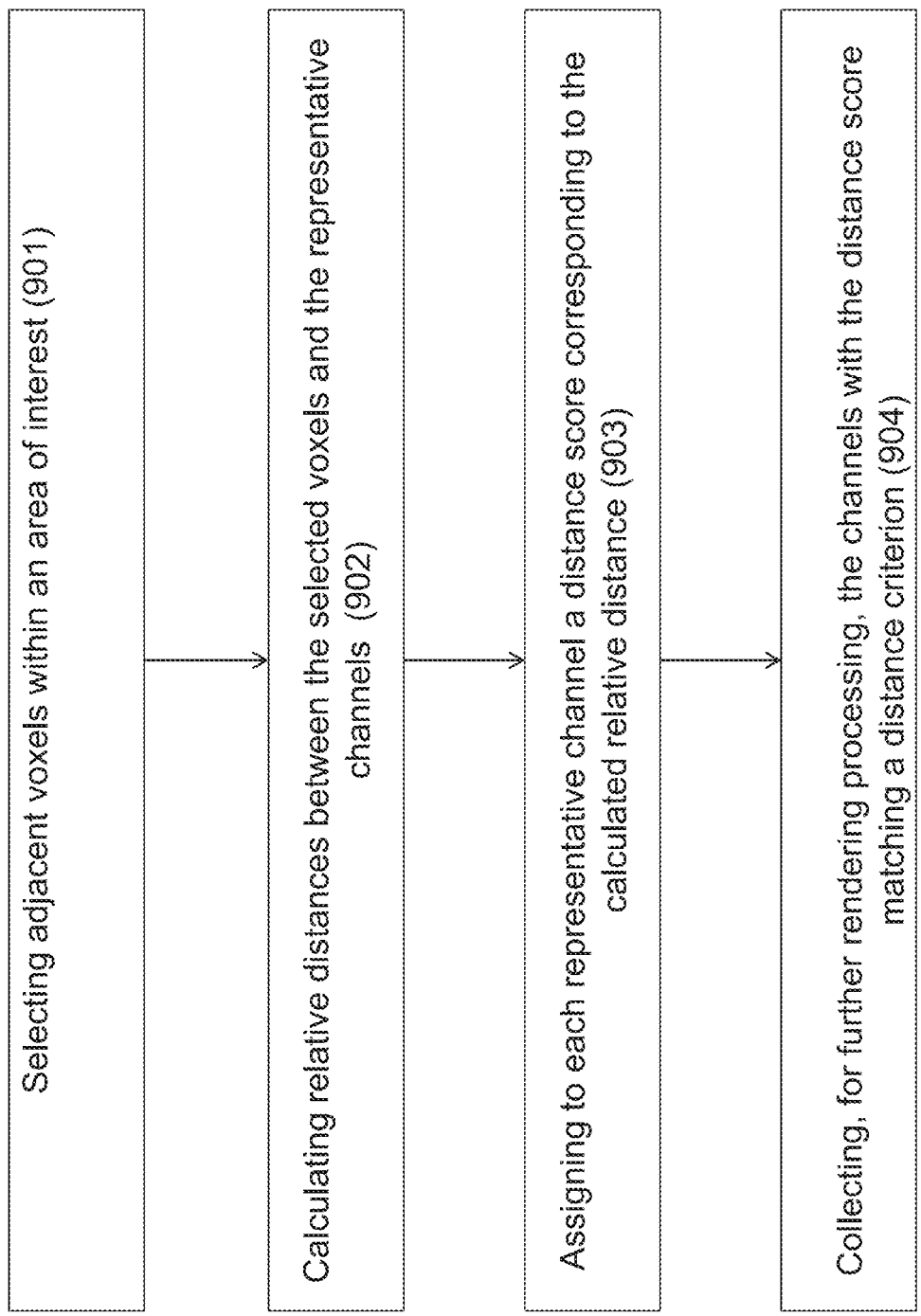
FIG. 9 illustrates a generalized flow diagram of selecting channels for further volume visualization processing in accordance with other embodiments of the presently disclosed subject matter.

Referring to FIG. 9, there is illustrated a generalized flow diagram of selecting the channels for further volume visualization processing in accordance with other embodiments of the presently disclosed subject matter. Alternatively or additionally to channel selection detailed with reference to FIG. 5, the channels for rendering processing can be selected in accordance with relative distance of respective representative channels from a region of interest. The contribution of a given channel into distinguishing between adjacent voxels depends on their relative distance from this given representative channel. The terms "relative distance of voxels from a given channel" and "relative distance of a given channel from voxels" used in this patent specification means the difference between 3D distances calculated, respectively, between each voxel and the given channel.

In accordance with certain embodiments of the presently disclosed subject matter, upon selecting a region of interest (e.g. an object of interest) and adjacent voxels therein (901), the volume visualization unit calculates (902) the relative distance between the adjacent voxels and the representative channels and assigns (903) to the representative channels respective distance scores corresponding to the relative distance of the adjacent voxels from the channel. The volume visualization unit further collects (904) for further visualization processing the channels with score matching a distance criterion (predefined and/or adaptive).

Typically, the relative distance is calculated for two adjacent voxels in the center of the region of interest. However, it is to be noted that the selection of representative channels is, likewise, can be provided in accordance with relative distance calculated for several pairs of adjacent voxels (e.g. in the center and at the edges of the region of interest).

In certain embodiments, each representative channel can be selected or not selected for further visualization processing in accordance with respective relative distance. Optionally, the volume visualization unit can be further configured to initially select channels in accordance with their relative distance, and further select channels among the selected channels in accordance with additional criteria (e.g. maximal number of channels from a given collection area as detailed with reference to FIG. 5). Alternatively or additionally, the volume visualization unit can be further configured to initially select channels in accordance with a shape of an object of interest (e.g. channels on even distance from a cylindrical object), and further select channels, among the previously selected channels, in accordance with relative distance, maximal number of channels from a given collection area and/or other criteria.

Figure 8B:
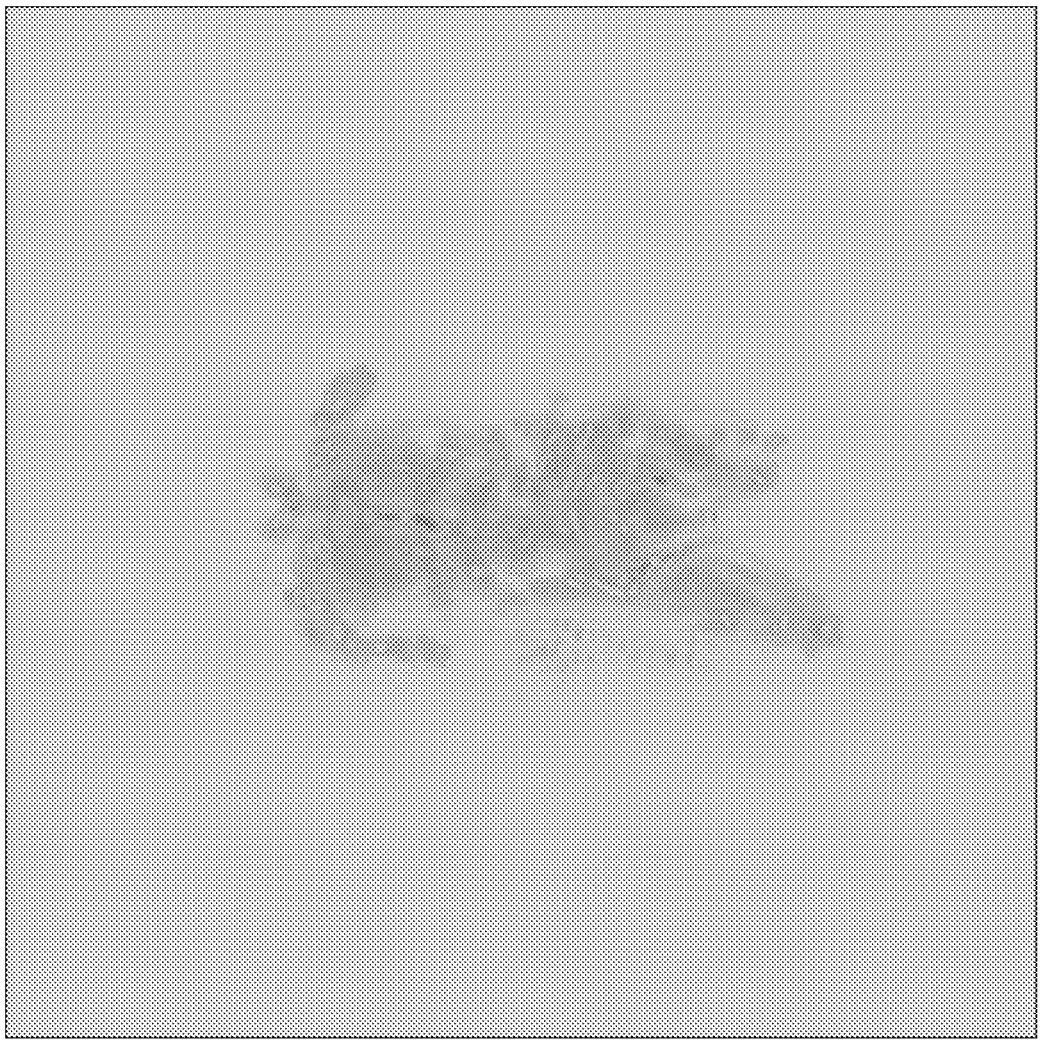

FIG. 8b illustrates, by way of non-limiting example, the rendered image of the same object as illustrated in FIG. 8a. The substantially reduced distortion results from rendering the channels selected in accordance with such combination. The number of channels collected in the non-limiting example illustrated in FIG. 8b is about ⅓ of the entire number of received channels.

Alternatively, the selection based on relative distance can be applied only to a part of the channels while the rest of the channels can be selected in accordance with other criteria. By way of non-limiting example, in the method detailed with reference to FIG. 5, the channels from different collection areas can be collected in different manners. For example, if a number of representative channels in a given collection area exceeds a predefined threshold, the channels can be selected in accordance with technique detailed with reference to FIG. 9, while for other given collection area with a number of representative channels less than this predefined threshold, $N \leq N_{max}$ channels can be collected in arbitrary manner.

The assigned distance score can correspond to a ratio R between respective relative distance and operating wavelength $\lambda$ of the radar system, and the distance criterion can be defined as a lower threshold value of the ratio. Optionally, the equal scores can be assigned to different ratio values within a predefined range of values. By way of non-limiting example, the maximal and equal scores (e.g. equal to ½) can be assigned to all representative channels characterized by relevant distance exceeding a half of the operating wavelength $\lambda$; next equal scores (e.g. equal to ½) can be assigned to all representative channels with the ratio ¼$\lambda \leq R \leq$½$\lambda$, etc. The distance criterion can be defined as a lower threshold equal to the maximal distance score. Thus, in this non-limiting example, the volume visualization unit will select for further visualization processing all representative channels characterized by relevant distance exceeding a half of the operating wavelength $\lambda$.

Optionally, operations 901-904 can be provided separately for channels with different polarization.

It is to be understood that the subject matter is not limited in its application to the details set forth in the description contained herein or illustrated in the drawings. The disclosed technique is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based can readily be utilized as a basis for designing other structures, methods, and systems for carrying out the several purposes of the presently disclosed subject matter.

It will also be understood that the system according to the disclosed subject matter can be a suitably programmed computer. Likewise, the disclosed subject matter contemplates a computer program being readable by a computer for executing the disclosed method. The disclosed subject matter further contemplates a machine-readable memory tangibly embodying a program of instructions executable by the machine for executing the disclosed method.

Those skilled in the art will readily appreciate that various modifications and changes can be applied to the embodiments of the invention as hereinbefore described without departing from its scope, defined in and by the claims associated with the present invention.

The invention claimed is:

1. A method of operating an ultra-wideband radar imaging system comprising processor operatively coupled to an antenna with at least one receiver and a plurality of transmitters operating in multi-static mode, the method comprising:

receiving by said at least one receiver a plurality of signals, each respectively representing return data in a channel associated with the receiver and one of the transmitters among said plurality of transmitters, thus giving rise to a plurality of spatial data channels;

among said plurality of spatial data channels selecting, by the processor, data channels for further processing; and providing, by the processor, volume visualization by processing data corresponding merely to the selected spatial data channels, wherein selecting, by the processor, spatial data channels for further processing comprises:

generating a two-dimensional map of a plurality of representative channels corresponding to said plurality of spatial data channels;

dividing the generated two-dimensional map into a plurality of collection areas, each matching a contribution criterion, wherein the contribution criterion requires substantially equal contribution of all representative channels mapped to a given collection area;

collecting from each collection area N $N_{max}$ representative channels, where $N_{max}$ is a threshold indicative of a maximal number of channels to be collected from a collection area; and selecting spatial data channels corresponding to the collected representative channels.

2. The method of claim 1 wherein generating the two-dimensional map comprises projecting representative locations characterizing the representative channels on a two-dimensional plane substantially perpendicular to the antenna's direction.

3. The method of claim 1, wherein the collection areas are obtained by dividing the generated two-dimensional map into equal-size squares with the side's size defined by the wavelength of transmitted/received signals.

4. The method of claim 1, wherein the threshold Nmax is predefined in accordance with a shape of antenna and/or characteristics of a target.

5. The method of claim 1, wherein the threshold Nmax is configured as adaptive to scene conditions and/or imaging scenario.

6. The method of claim 1, wherein N Nmax representative channels are collected from a given collection area in an arbitrary manner.

7. The method of claim 1, wherein at least part of the spatial data channels is selected in accordance with relative distance of corresponding representative channels from adjacent voxels corresponding to a region of interest.

8. The method of claim 7, wherein selecting the spatial data channels comprises assigning to each representative channel a distance score corresponding to a relative distance of two adjacent voxels from the respective channel and selecting spatial data channels corresponding to the representative channels with distance score matching a distance criterion.

9. The method of claim 8, wherein the assigned distance score corresponds to a ratio R between respective relative distance and an operating wavelength $\lambda$ of the radar.

10. An ultra-wideband radar imaging system comprising a volume visualization unit operatively coupled to an antenna with at least one receiver and a plurality of transmitters operating in multi-static mode, wherein:

said at least one receiver is configured to receive a plurality of signals, each respectively representing return data in a channel associated with the receiver and one of the transmitters among said plurality of transmitters, and said volume visualization unit is configured:

to digitalize said plurality of signals thus giving rise to a plurality of spatial data channels;

to select among said plurality of spatial data channels data channels for further processing; and to provide volume visualization by processing data corresponding merely to the selected spatial data channels, wherein selecting the spatial data channels by the volume visualization unit comprises:

generating a two-dimensional map of a plurality of representative channels corresponding to said plurality of spatial data channels;

dividing the generated two-dimensional map into a plurality of collection areas, each matching a contribution criterion, wherein the contribution criterion requires substantially equal contribution of all representative channels mapped to a given collection area;

collecting from each collection area $N \leq N_{max}$ representative channels, where $N_{max}$ is a threshold indicative of a maximal number of channels to be collected from a collection area; and selecting spatial data channels corresponding to the collected representative channels.

11. The system of claim 10, wherein the volume visualization unit is further configured to select at least part of the spatial data channels in accordance with relative distance of corresponding representative channels from adjacent voxels corresponding to a region of interest.

12. A volume visualization unit to be used in conjunction with an ultra-wideband radar comprising an antenna with at least one receiver and a plurality of transmitters operating in multi-static mode, wherein said volume visualization unit is configured:

to digitalize a plurality of signals each respectively representing return data in a channel associated with said at least one receiver and one of the transmitters among said plurality of transmitters thus giving rise to a plurality of spatial data channels;

to select among said plurality of spatial data channels data channels for further processing; and to provide volume visualization by processing data corresponding merely to the selected spatial data channels, wherein selecting the spatial data channels comprises:

generating a two-dimensional map of a plurality of representative channels corresponding to said plurality of spatial data channels;

dividing the generated two-dimensional map into a plurality of collection areas, each matching a contribution criterion, wherein the contribution criterion requires substantially equal contribution of all representative channels mapped to a given collection area;

collecting from each collection area $N \leq N_{max}$ representative channels, where $N_{max}$ is a threshold indicative of a maximal number of channels to be collected from a collection area; and selecting spatial data channels corresponding to the collected representative channels.

13. The volume visualization unit of claim 12 further configured to generate the two-dimensional map using projecting representative locations characterizing the representative channels on a two-dimensional plane substantially perpendicular to the antenna's direction.

14. The volume visualization unit of claim 12 further configured to obtain the collection areas by dividing the generated two-dimensional map into equal-size squares with the side's size defined by the wavelength of transmitted/received signals.

15. The volume visualization unit of claim 12 further configured to collect $N \leq Nmax$ representative channels from a given collection area in an arbitrary manner.

16. The volume visualization unit of claim 12 further configured to select at least part of the spatial data channels in accordance with relative distance of corresponding representative channels from adjacent voxels corresponding to a region of interest.

17. The volume visualization unit of claim 16 further configured to select the spatial data channels using assigning to each representative channel a distance score corresponding to a relative distance of two adjacent voxels from the respective channel and selecting spatial data channels corresponding to the representative channels with distance score matching a distance criterion.

18. A non-transitory computer readable storage medium comprising computer readable program code embodied therein for operating an ultra-wideband radar imaging system comprising an antenna with at least one receiver and a plurality of transmitters operating in multi-static mode, the computer readable program code for:

selecting among a plurality of spatial data channels data channels for further processing, wherein the plurality of spatial data channels corresponds to a received plurality of signals, each respectively representing return data in a channel associated with said at least one receiver and one of the transmitters among said plurality of transmitters;

providing volume visualization by processing data corresponding merely to the selected spatial data channels, wherein selecting spatial data channels for further processing comprises:

generating a two-dimensional map of a plurality of representative channels corresponding to said plurality of spatial data channels;

dividing the generated two-dimensional map into a plurality of collection areas, each matching a contribution criterion, wherein the contribution criterion requires substantially equal contribution of all representative channels mapped to a given collection area;

collecting from each collection area $N \leq N_{max}$ representative channels, where $N_{max}$ is a threshold indicative of a maximal number of channels to be collected from a collection area; and selecting spatial data channels corresponding to the collected representative channels.

* * * * *